Patented Oct. 10, 1939

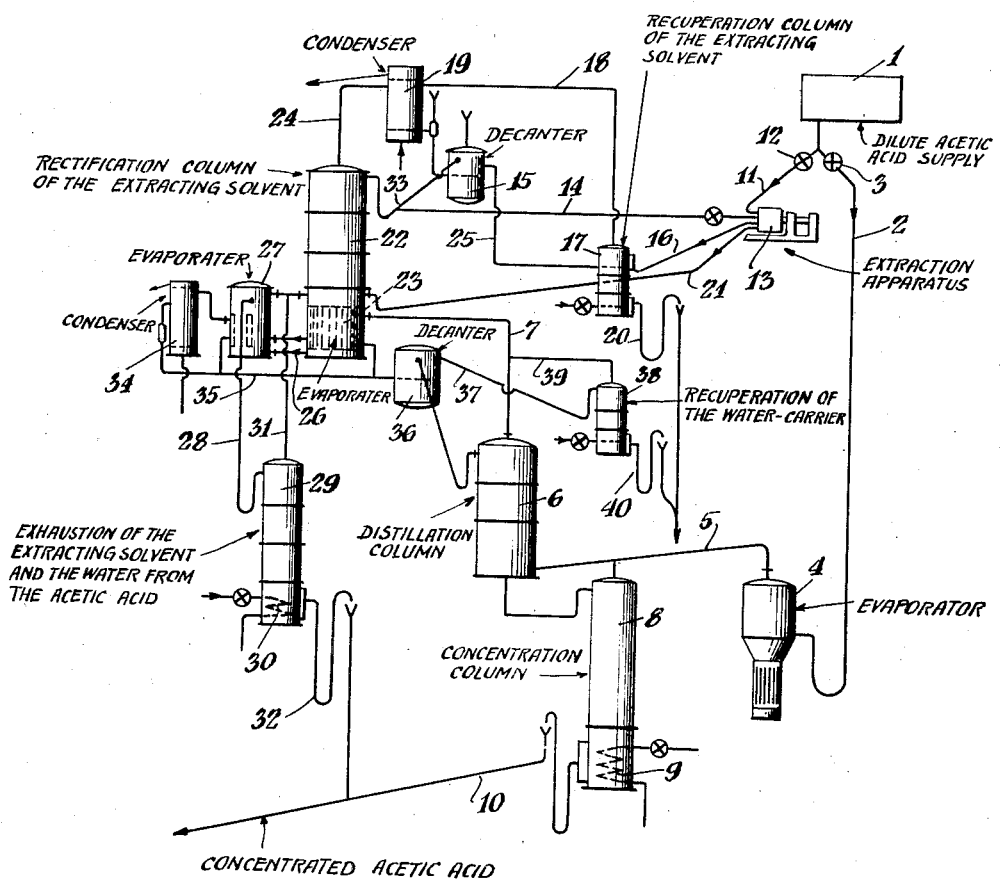

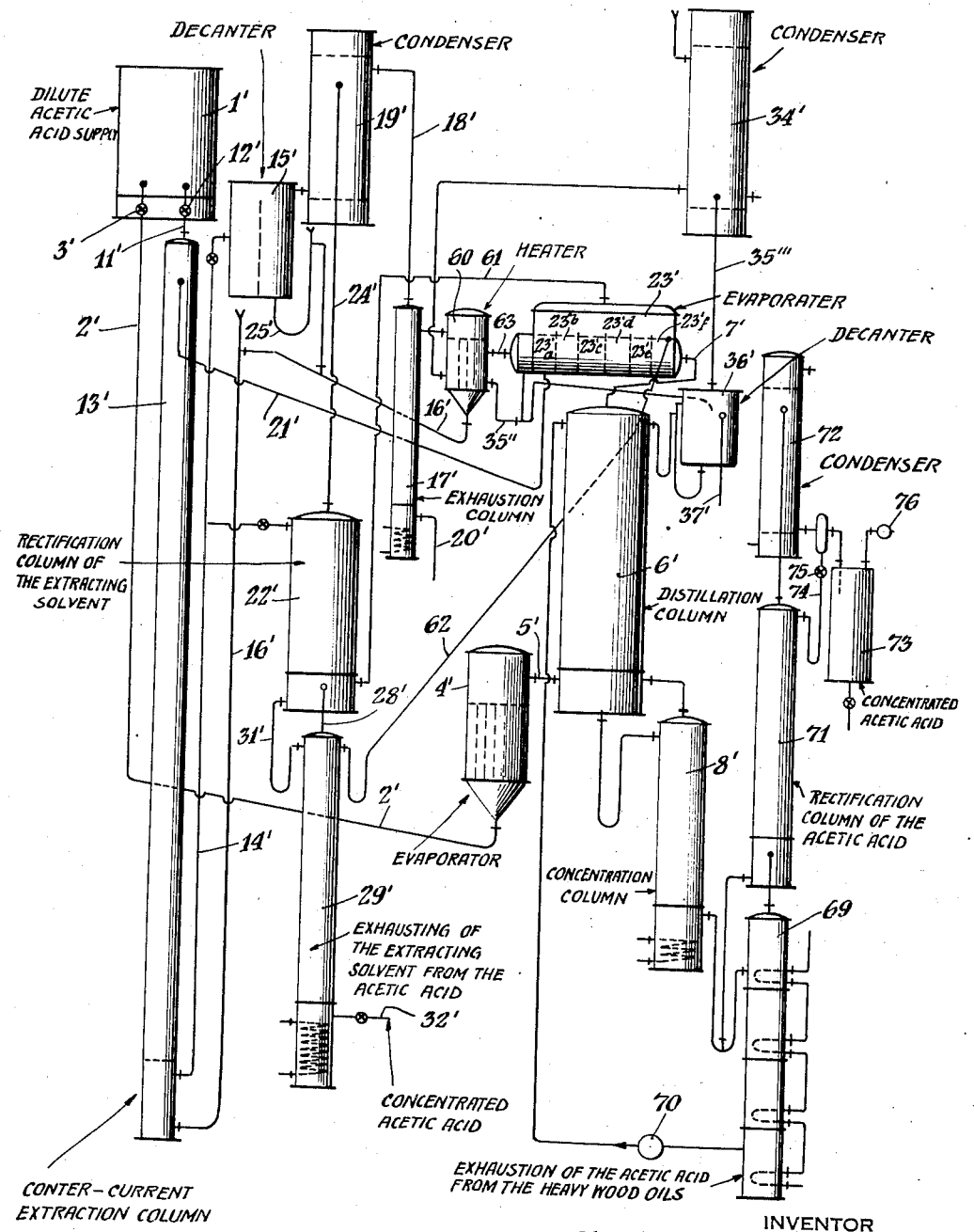

2,175,879

UNITED STATES PATENT OFFICE 2,175,879

TREATMENT OF AQUEOUS SOLUTIONS OF ACETIC ACID

Charles Jean Louis Coutor, Premery, France, assignor to Société Anonyme Etablissements Lambiotte Frères, Premery (Nievre Department), France Original application July 22, 1935, Serial No. 32,572. Divided and this application February 24, 1937, Serial No. 127,423. In France July 10, 1935

4 Claims. (Cl. 202—42)

This invention relates to a process for concentrating aqueous solutions of acetic acid.

Several methods have been already proposed for concentrating acetic acid in aqueous solutions. One of these methods, which has already been described in year 1884 by Goering consists in extracting the acetic acid in a liquid phase by means of solvents having a low boiling temperature such as ethyl acetate, ethyl oxide, amyl alcohol and the like, the said solvents being then separated from the acid by any usual distillation process. The said extracting method which a priori seems to be simple and economical, is however from the calorific point of view not so economical as it seems to be, since experience shows that it leads, in order not to necessitate a too costly extraction material, to the use of quantities of solvent which are equal to several times the volume of the solution to be exhausted, and the subsequent evaporation and dephlegmation of which require a considerable consumption of heat.

Other methods consist in treating the water and acid mixture in the vapor phase in a column by means of a suitable third body acting as a solvent for the acid. Among such methods it will be well to mention more particularly the method of concentration by azeotropic distillation, in which the third body plays the part of a water carrier and which process requires the total vaporization of the diluted solution and of the carrier.

Now it has been found that it is possible, according to the present invention, to realize a considerable economy of steam by combining in a judicious manner the method of extraction of acetic acid in the liquid phase by means of a solvent with a method of treatment in the vapor phase.

For this purpose, the invention essentially consists in distilling one part of the solution to be concentrated in the presence of a water-carrier or entraining liquid, subjecting the other part to an extracting treatment in a liquid state by means of a solvent for the acetic acid, and evaporating the extracting solvent at least partially by the heat evolved in the condensation of the product of the distillation. An extracting solvent is employed which has a boiling point low enough to be vaporized by the heat evolved in the condensate of the distillation, and also is one which forms an azeotrope with water.

When operating at atmospheric pressure the solvents used for extracting the acetic acid in a liquid phase are preferably bodies having a low boiling point such as methyl propionate, ethyl acetate, isopropyl oxide, propyl oxide or mixtures of such bodies. When the vaporization of the extracting solvent is effected at a pressure which is lower than the pressure for the treatment in the vapor phase, solvents having higher boiling points may be used.

The extraction of the acid by the solvent may be effected in a counter-current device of any type, either static or dynamic.

The process according to the invention may be carried out with the distillation in an azeotropical way of part of the solution to be concentrated; the bodies which may be used as water carriers are more particularly butyl acetate, mesityl oxide, light wood oils, butyl alcohol, amyl alcohols, ethyl butyrate or mixture of such bodies, or other bodies capable of forming with water an eutectic, the condensation temperature of which at the pressure at which the treatment is effected is high enough for producing the vaporization of the solvent used for the extraction of the acid in the liquid phase.

The process may be applied also with a dehydration of the acid in the vapor phase effected in the presence of a heavy solvent of the acid, more particularly such as heavy wood oils, the vapors which form at the top of the dehydration column, and which are in this case almost exclusively water, are used as before for vaporizing the light solvent which has been used for the extraction in the liquid phase, while the heavy oils loaded with acid are submitted to a distillation so that the acid is separated from the said oils.

In both cases the fractions of the solution of acid to be concentrated, which are intended respectively to be submitted to distillation and to be treated by a solvent in the liquid phase, are advantageously so determined that the heat which can be recovered in the treatment of the first fraction corresponds substantially to the heat required for the treatment of the second fraction.

Several devices for carrying out the process according to the present invention are shown diagrammatically and by way of non-restrictive examples in the appended drawings.

In these drawings,

Figure 1 shows a device adapted for the concentration of an aqueous solution of acetic acid which is not loaded with impurities and with azeotropical distillation.

Figure 2 shows a device adapted for the concentration of an aqueous solution of acetic acid which is not loaded with impurities and with distillation in the presence of a heavy solvent.

In the example of Figure 1, 1 is the supplying vessel containing the solution to be treated. A part of this solution is led by a line 2 with a cock 3 to a heater 4 of the type in which all of the volatile part of the liquid admitted is integrally vaporized in a continuous manner, from which heater the vapors of the acid are led through a line 5 into a dehydration column 6 filled with butyl acetate. The mixture of steam and butyl acetate escapes approximately free from acid at the top of the column 6 through a pipe 7, while the condensed acid and water flow out at the lower part of the said column into a column 8 heated at its bottom by a heater 9. At 10 concentrated acid flows out.

The other part of the diluted acetic acid contained in the supplying vessel 1 is led through a line 11 with a cock 12 into an extraction device 13 of the counter-current type, for instance a turbine apparatus. On the other hand this device also receives a solvent for the acetic acid such as ethyl acetate, which is brought by a line 14 and comes from a decanter 15. The water flows out approximately free from acid through a pipe 16 which leads it to a small column 17 in which it is freed from the dissolved ethyl acetate, the latter being returned through a line 18 to a condenser 19, while the water is discharged at 20. The ethyl acetate loaded with acid is led through a line 21 into the bottom of a column 22 provided with a heater 23 which receives through the pipe 7 the vapors escaping at the top of the distillation column 6 and which acts as a condenser for the latter.

At the top of the column 22 a mixture of vapors of ethyl acetate and steam escapes which are led through a pipe 24 into the condenser 19. The heterogeneous condensate which is produced in this condenser flows out into the decanter 15, where it is decanted and from which the ethyl acetate is returned to the extraction device 13, while the water is led through a pipe 25 to the small column 17 which already receives the exhausted waters coming from the extraction device 13.

The bottom of the column 22 is provided with a heater 23 which vaporizes without cost a part of the solvent saturated with acid coming through the pipe 21 from the extraction device 13, the heat for this heater being supplied by the vapors of the column 6 arriving through the pipe 7. The liquid which has not been vaporized in the heater 23 flows out into the heater 27 through the pipe 26; a new part of the liquid is vaporized by the vapors of the eutectic in excess which escapes from the heater 23.

The non-vaporized mixture of solvent, water and acid flows out of the heater 27 through the pipe 28 into the column 29 which is heated at its bottom by means of a coil 30 and which exhausts the ethyl acetate and the water from the acid. The vapors of ethyl acetate and water are returned through a pipe 31 into the bottom of the column 22, while the concentrated acid is discharged at 32. The column 22 receives from the decanter 15 through a pipe 33 a refluxed part of ethyl acetate which is so controlled as to insure a very low acid titration for the solvent which is recovered.

The binary mixture of butyl acetate and water which comes from the azeotropical dehydration column 6 and flows through the heaters 23 and 27 is condensed in these heaters and then in a security cooler 34. The condensate is led through a pipe 35 into a decanter 36 by means of which the butyl acetate is returned into the column 6, while the neutral water is led through a pipe 37 into a small column 38 which exhausts the dissolved butyl acetate therefrom and returns this product as vapor through a pipe 39 to the top of the column 6. The exhausted water is discharged at 40.

In the arrangement according to Figure 2, 1' is the supplying vessel containing the solution to be treated, for instance a non-tarry aqueous solution of acetic acid. A portion of this solution is conducted through a line 2' provided with a cock 3' into an evaporator 4' in which it is entirely vaporized, and the vapors are introduced through a pipe 5' into the bottom of a column 6' the upper part of which is filled with wood oils having a boiling point higher than 230° C. The vapor of water which escapes at the top of the column 6' with some oil carried with it is conducted through a pipe 7' for use for the vaporization of the solvent which has extracted the acid in the liquid phase, as will be explained hereinafter. The heavy oils which are loaded with acid flow into a dehydration column 8' and pass from the latter into a separation heater 69 which permits the complete distillation of the dissolved acid. The heavy oils from which the acid has been exhausted, are taken again by a pump 70 and forced into the upper part of the column 6' for pursuing the extraction cycle. The acid vapors escaping from the top of the column 69 are led into a column 71 where they are separated from the heavy products, and the acid which has been condensed in a condenser 72 is collected in a vessel 73, part of this acid being refluxed into the column 71 through a pipe 74 provided with a control valve 75. In order to facilitate the separation of the acid from the tar, the heater 69, the column 71, the condenser 72 as well as the collecting vessel 73 are advantageously maintained under a suitable vacuum by means of a vacuum pump 76.

The other portion of the solution contained in the vessel 1' may be directed through a pipe 11' provided with a cock 12' into an extraction device 13' of the counter-current type, for example, a column containing contact elements, the liquid to be treated arriving at the top of the said column and the solvent (for instance methyl propionate) arriving at the bottom thereof through a pipe 14'. The water flows out approximately free from acid through a line 16' and is led to a pre-heater 60 (heated in a manner to be described later) from which it is discharged into a small column 17' in which it is freed from the dissolved solvent; the latter is returned through a line 18' to a condenser 19' while the water is discharged at 20'. On the other hand, the solvent, which is saturated with acetic acid, is discharged in a continuous manner from the exhaustion column 13' through a pipe 21' and is conducted into a vaporization device 23' comprising a series of horizontal tubes divided into compartments 23'a, 23'b ... 23'f, through which the vapors of the water coming from the distillation column 6' through the pipe 7' pass.

The vapors of the solvent and water in azeotropic mixture, and some of the acetic acid produced in the vaporizer 23' are conducted through a pipe 61 to the bottom of a column 22' at the top of which a mixture of vapors of solvent and water escapes in an azeotropic mixture, which is conducted through a pipe 24' into the condenser 19'. The heterogeneous condensate produced in this latter flows into a decanter 15' where it is decanted and from which the solvent is returned through the pipe 14' to the exhaustion column 13'. The water flowing out of the decanter 15' through the pipe 25' is led into the pipe 16' where it is added to the exhausted waters flowing out of the counter-current column 13', going to the heater 60.

At the bottom of the column 22' a ternary mixture of solvent, acetic acid and water flows out and is directed through a pipe 31' into a column 29' which also receives through a pipe 62 the non-vaporized liquid which flows out through the overflow of the last compartment 23'f of the vaporizer 23'. The said column 29' exhausts from the acid the solvent and water and the vapors of these bodies are returned through a pipe 28' to the bottom of the column 22', while the concentrated acetic acid is drawn off at 32'. Columns 22' and 29' function in effect as a single column. The water vapor loaded with heavy oils which comes from the dehydration column 6' and flows through the vaporizer 23' is partially condensed in this latter. The condensate is led through a pipe 35' into a decanter 36' where the few heavy oils capable of being decanted are returned to the top of the column 6' while the water which is discharged at 37' is conducted to the sewage. The vapor which has not been condensed in the vaporizer 23' is led by a pipe 63 through the heater 60 for the waters which are saturated with solvent and then into a condenser 34'. The liquid which has been condensed in both these devices is led through pipes 35'' and 35''' into the dectanter 36'.

This application is a division of application Serial Number 32,572, filed July 22, 1935, now the Charles Patent No. 2,079,789 in the file of which the present claimed subject matter was disclosed and in which applicant through inadvertence and mistake filed as a joint inventor.

I claim:

1. A process for concentrating an aqueous solution of acetic acid which comprises distilling one portion of the acid solution azeotropically with an entraining liquid to dehydrate said solution, subjecting another portion of the acid solution to an extraction treatment in the liquid phase with a solvent for acetic acid to remove the acid from said solution, and evaporating the extraction solvent from said extracted acid at least partially by the heat evolved in the condensation of the vapor of the azeotropic distillation, said extraction solvent having a boiling point low enough so that it can be vaporized by said heat and also being one which forms an azeotropic mixture with water.

2. A process according to claim 1 in which the entraining liquid comprises butyl acetate.

3. A process according to claim 1 in which the entraining liquid comprises butyl acetate and the extraction solvent comprises ethyl acetate.

4. A process according to claim 1 in which the several portions of the acid solution subjected respectively to the two treatments are so proportioned that the heat recovered in the treatment of the first mentioned portion substantially corresponds to the heat required for the vaporization of the solvent which is used in the treatment of the second mentioned portion.

CHARLES JEAN LOUIS COUTOR.